Feb. 28, 1928.
H. H. SMITH
METALLIZED PAVEMENT
Filed May 15, 1926  3 Sheets-Sheet 1
1,660,769
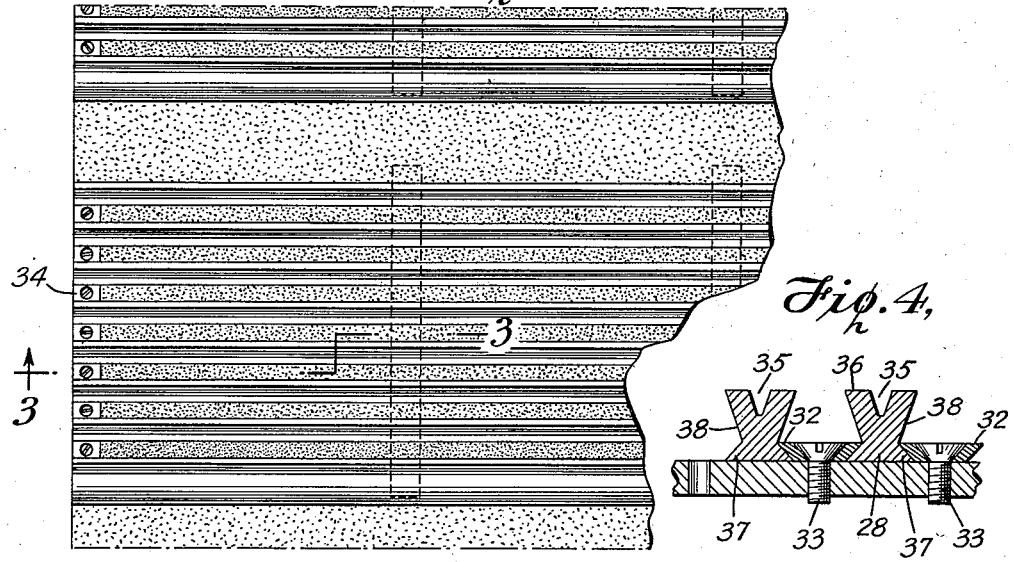
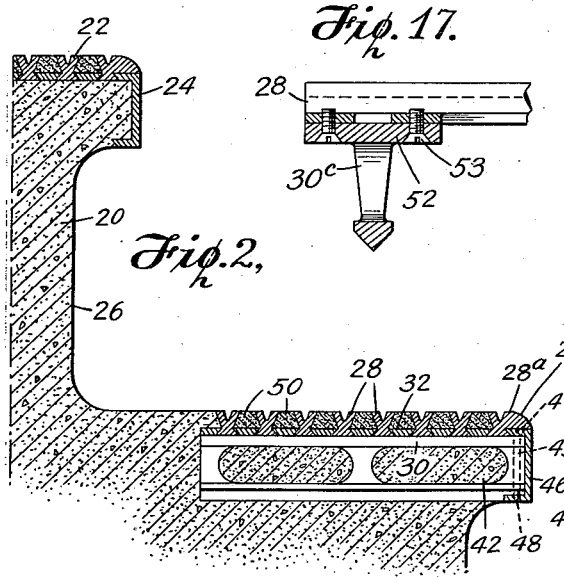
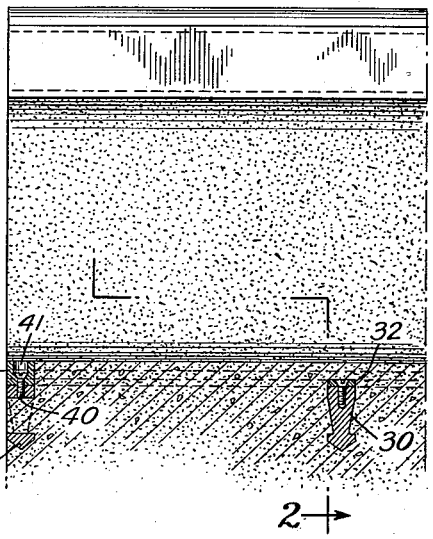
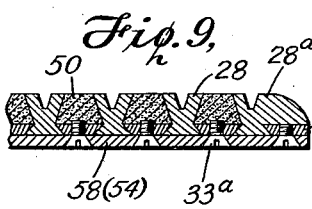
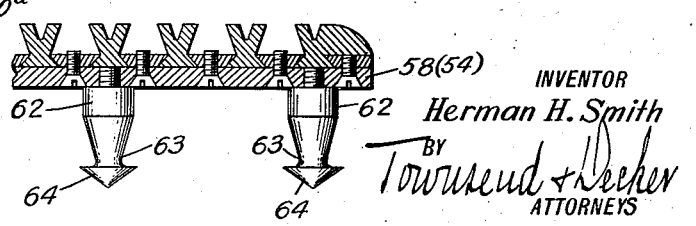
INVENTOR
Herman H. Smith
BY
Townsend + Decker
ATTORNEYS

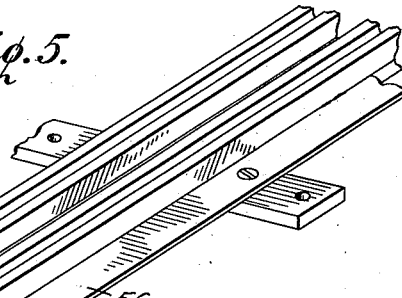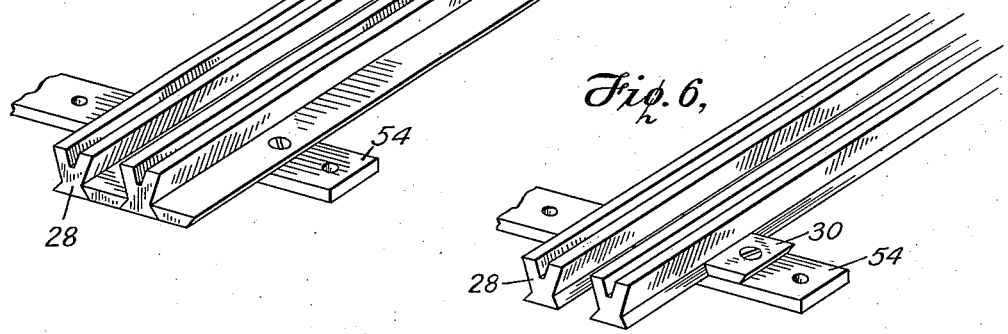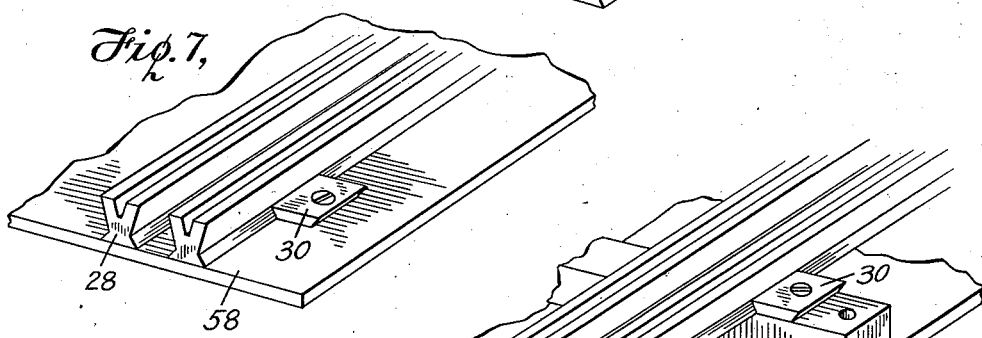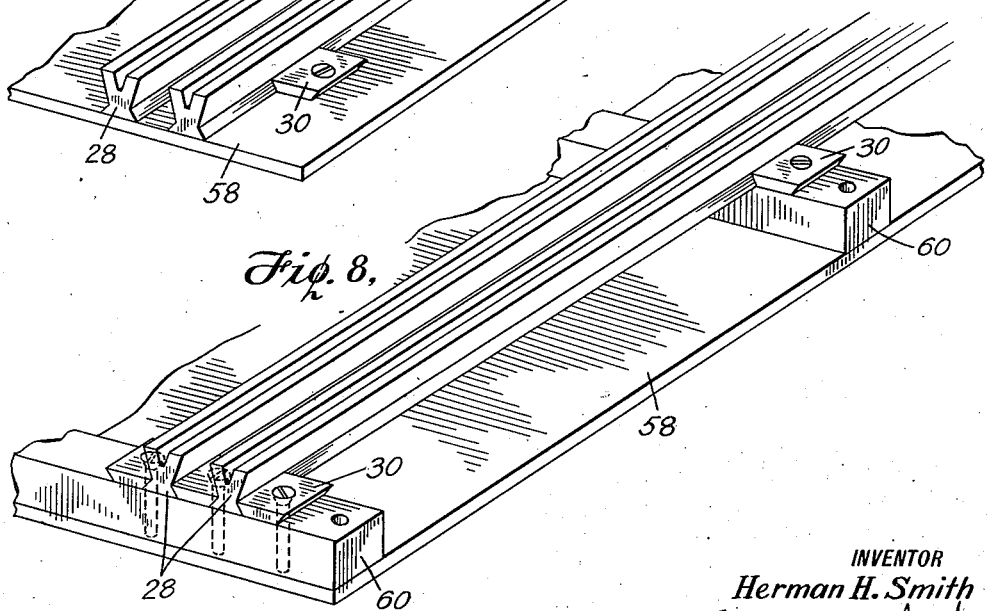

Feb. 28, 1928. 1,660,769
H. H. SMITH
METALLIZED PAVEMENT
Filed May 15, 1926    3 Sheets-Sheet 3
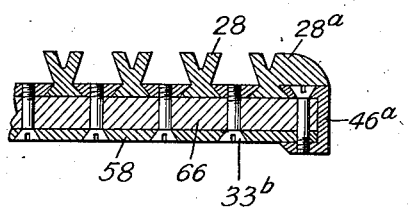
Fig. 11,
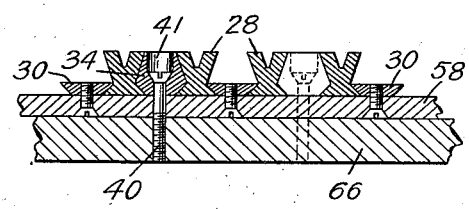
Fig. 12,
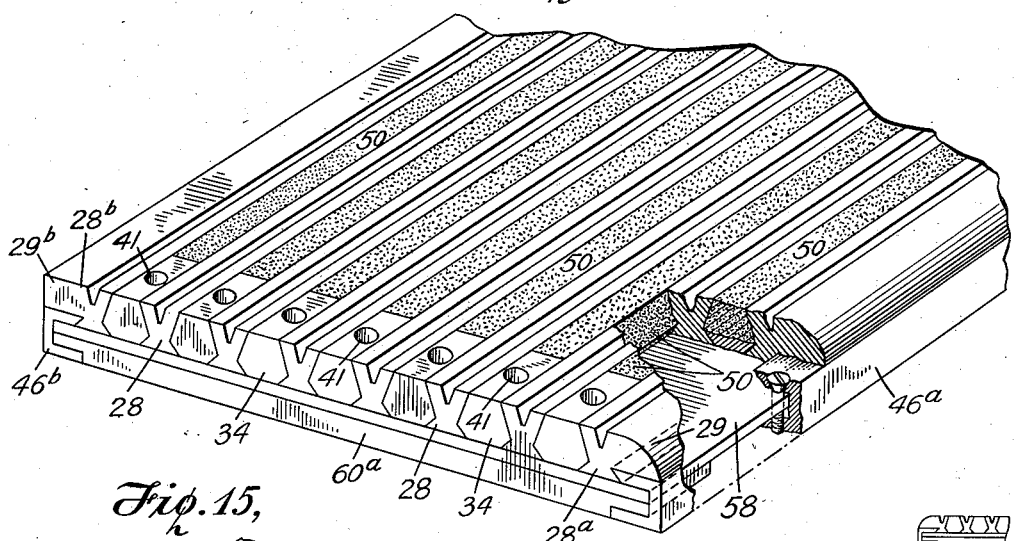
Fig. 13,
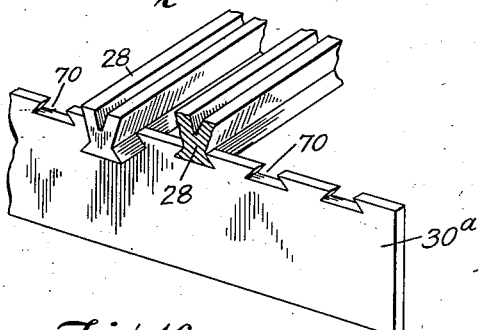
Fig. 15,
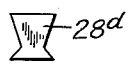
Fig. 16,
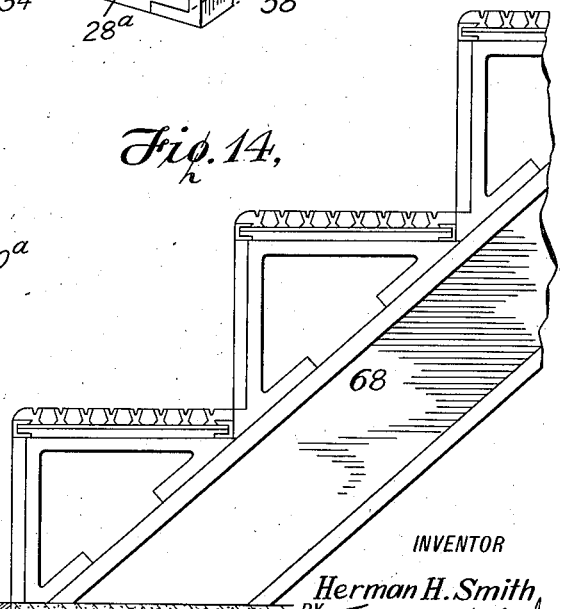
Fig. 14,
INVENTOR
Herman H. Smith,
BY Townsend & Decker
ATTORNEYS Patented Feb. 28, 1928.

1,660,769

UNITED STATES PATENT OFFICE.

HERMAN H. SMITH, OF BROOKLYN, NEW YORK.

METALLIZED PAVEMENT.

Application filed May 15, 1926. Serial No. 109,223.

This invention relates to improvements in metallized pavements and is particularly applicable to walkway surfaces such as steps, sidewalks, and other surfaces used by pedestrians.

It is one of the primary objects of the invention to provide a composite unit formed of a plurality of surface bars rigidly secured together and to a base plate or plates, the character of the bars and plates used permitting them to be rolled, drawn or molded.

It is a further object to so shape and space the bars as to permit portions of pavement material to be positioned between and firmly secured in position by the bars and with the pavement material exposed adjacent the exposed portions of the bars.

It is a still further object to secure the elements of the unit together by means positioned inwardly of the surface of the unit so that wear thereupon will not disturb the securing means.

These and other objects will appear more fully from the following description when considered in connection with the drawings in which:

Fig. 1 is a plan view of a portion of a stairway showing one form of my invention applied thereto.

Fig. 2 is a transverse sectional view thereof on the line 2—2 of Fig. 1.

Fig. 3 is a sectional view taken substantially on the line 3—3 of Fig. 1.

Fig. 4 is an enlarged sectional view of the bars and clamps shown in Fig. 2.

Fig. 5 is a perspective view of a portion of a skeleton metal unit showing a different adaptation of my invention.

Figs. 6, 7 and 8 are similar perspective views showing slightly modified forms or adaptations of the invention.

Fig. 9 is a transverse sectional view of the unit shown in Fig. 7 with a specially prepared pavement filler between the tread bars.

Fig. 10 is a view similar to Fig. 9 with the addition of anchoring pins for a purpose to be hereinafter referred to.

Fig. 11 is a transverse sectional view of the metal unit shown in Fig. 8.

Fig. 12 is a transverse sectional view of a portion of a unit disclosing one method of securing the same to a wooden or steel frame structure.

Fig. 13 is a perspective view, parts thereof being broken away, showing one filled metal unit ready for installation.

Fig. 14 is a transverse sectional view of a section of a stairway showing the unit of Fig. 13 in position.

Fig. 15 is a perspective view of a slightly modified form of the anchor cross-piece which may be substituted for that shown in Figs. 1 to 3.

Fig. 16 is an end elevational view of a metallic unit showing a modified configuration for the tread bars.

Fig. 17 shows a slight modification of the anchor plate shown in Figs. 1 to 3.

In the improved metal walkway surfaces herein disclosed there are many adaptations which the invention may assume. One of the main advantages of the invention is that metallized tread surfaces may be supplied for practically any desired use without materially varying the characteristics of the tread surface. It can obviously be made of any desired heights, widths, lengths and can be used with any type of supporting structure, such as concrete, wood or metal, the result in each instance being a substantially non-slipping surface which will endure long wear and which, after it is once installed, will ordinarily require no further attention. Since the metal portion of the pavement is made up of a number of separate units permitting the exposure of the pavement material between the same, it is contemplated to expose the main pavement material therethrough or to supply a special plastic filler which will become monolithic with the main pavement material, or to use a pre-formed filler constructed of any desirable material such as tile preferably having a high coefficient of friction.

The invention herein disclosed constitutes an improvement on my prior Patent No. 1,560,354, dated Nov. 3, 1925, and my application Serial No. 99,454, filed April 3, 1926, reference being had to said patent and application showing additional advantages and applications of my invention.

Referring to the details of the drawings and in particular to Figs. 1 to 4 wherein the first form of my invention is disclosed, the pavement material 20 forming the main body of the stairway is of a usual construction and suitably reinforced according to the present engineering practices. Each of the stair treads 22 usually extends outwardly, as indicated at 24, a certain distance beyond the vertical portion 26 of the stairway. The metal unit shown in Figs. 1 to 4 is of the open or skeleton type so that the pavement material may penetrate through and around the metal unit for securely anchoring the unit therein and reinforcing the pavement material while exposing the latter adjacent the surface of the unit.

The metallic unit shown in these figures includes the tread bars 28 extending longitudinally of the stair tread and secured to the anchor cross-pieces 30 by means of the clamps 32 and lugs 34. The lugs 34 may be omitted in this form of the invention permitting the filler, hereinafter referred to, to extend to and into the pavement material 20 if desired. The bars 28 according to the preferred form of my invention are formed with surface grooves 35 and with upper side projections 36 and lower side projections 37 forming the concave sides 38 as shown. The clamps 32 are received between successive bars 28 engaging the lower projections 37 thereof for preventing transverse or upward movement of the bars, the clamps being apertured for receiving bolts or other securing elements 33 passing therethrough and into the anchor cross-piece 30. The lugs 34 for holding the ends of the bars in position are shown in detail in Fig. 12 and include upper and lower inclined surfaces for engagement with the upper and lower projections 36 and 37 of the bars. The lugs are secured to the cross-bars by means of screws or bolts 40, the head of said bolt or screw passing through the cylindrical opening 41 in the lug so that wear upon the surface of the unit will not wear away the head of the securing element.

The anchor cross-piece 32 is formed with openings 42 permitting the pavement material to pass therethrough for anchoring the unit therein. The cross-piece is preferably formed slightly wedge-shaped as indicated for example in Fig. 3 and includes the wedge-shaped point 33 facilitating the introduction of the cross-piece into the pavement material and constituting an enlarged head for preventing withdrawal of the cross-piece from the pavement material.

One of the surface bars herein termed the nosebar 28ª which forms the forward edge of the stair tread includes an enlarged, rounded extension 29 protecting the forward edge of the unit and stair tread. The forward edge of the bar 28ª may be secured in position by one of the clamps 32, although it is preferred to employ the face-plate 46 having the upper and lower extensions 47 and 48 engaged against the nosebar 28ª and anchor cross-piece respectively. The face-plate 46 may be secured to the anchor bar by means of the bolt 49 as shown in Fig. 2, the bolt passing through the upper and lower flanges and vertically through the anchor cross-piece. The unit shown in Figs. 1 to 4 being of the open or skeleton type, permits the pavement material to be positioned around and between the bars 28 and to be exposed adjacent the upper surface of said bars. The portion 50 of the pavement material, herein termed the filler, positioned between the bars, may be of the same material as the pavement material or it may be differently constituted so as to form a more desirable tread surface than the concrete of which a stairway is customarily formed. In the latter case it is preferred to form the filler between the bars of cement to which carborundum has been added as this has been found to be highly satisfactory for tread surfaces. The filler may be compressed into the space between the bars 28 before the concrete has fully set so that the filler and pavement material of the stairs will unite and form a monolithic body. The concave sides 38 and particularly the upper extensions 36 securely hold the filler in position, the relatively large and continuous body of filler between each successive pair of bars preventing the filler material from being injured or displaced. It is obvious that if desired the filler 50 may be pre-formed as described below although it is preferred to form the same of plastic material uniting with the body of the pavement material forming the stairs.

In the first form of the invention the securing bolts for the clamps 32 (and lugs 34 if the latter are used) pass directly into the body of the anchor cross-pieces 30. Under certain conditions it may be desirable to reinforce these cross-pieces, as shown in Fig. 17, by providing a cross-head 52 for each cross-piece, in which case the securing bolts 53 may pass upwardly through the cross-head, into the clamps 32 or surface bars 28, or they may pass downwardly through the clamps 32, into the cross-head 52. The cross-head 52 serves to strengthen the anchor plate and attachment means between the anchor plate and bars.

In Figs. 5 to 8 there are disclosed modified forms of the invention in which the units are adapted to be applied to fixed treadways such as wooden or steel frames. Referring to Fig. 5, the bars 28 are shown as rigidly secured to the cross-pieces 54 by means of the elongated clamp plates 56 engaging the lower projections 37 of the bars and being secured to the cross-pieces by suitable bolts, rivets or screws. The clamp plates 56 extending the full length of the bars 28, make the unit into a closed unit so that the filler positioned between the upper portions of the bars will not be engaged by the framework supporting the tread unit. The filler members may be either pre-formed or compressed into the space between successive bars to harden in place therein, either type of filler bar being permissible with this form of the invention. An application of this unit is described below in connection with Fig 13.

The unit shown in Fig. 6 is similar to that shown in Fig. 5, the main difference being that the relatively short clamps 30, as in the first form of the invention, are employed for attaching the surface bars to the cross-plates 54. This construction forms a skeleton unit applicable for attachment either to a fixed stairway such as a wooden or steel stairway, or it may be embedded in or rest upon a pavement material as in the first form of the invention.

In Fig. 7 there is disclosed a slightly modified form of my invention wherein the bars 28 are supported upon a bed-plate 58 and secured thereon by means of the clamps 30, as shown, or by means of the clamp-plates 56, if desired, to make the bed-plate more rigid. With this form of the invention the upper portion of the tread unit is closed from the supporting structure which may be either concrete or a wooden or steel frame, the unit being adapted to be placed upon the surface of the step as shown for example in Fig. 14. The filler which fills the spaces between the bars 28 may be pre-formed, as of tile or the like, or it may be composed of cement and carborundum compressed into the spaces between the bars so as to fill the concave sides of the bars and be retained in position thereby.

In Fig. 8 the bars 28 are shown as supported upon the bed-plate 58 but being spaced from the bed-plate by means of a series of risers 60 formed of any preferred metal, the risers serving to give greater thickness to the tread unit and permitting the introduction of pavement material into the entire space between the bed-plate 58 and the upper surfaces of the bars 28. The bars are secured to the risers 60 and bed-plate 58 by means of the clamps 30, suitable screws or bolts passing through the clamps and risers and into the bed-plate.

In Fig. 9 I have shown a section of a completed unit constructed as shown in Figs. 5, 6 or 7, with the bars 28 and 28ª secured to the bed-plate 58 or cross-piece 54, the fillers 50 being either pre-formed or molded into the unit. It is to be noted that the terminal bar 28ª is engaged and secured in position by a modified form of clamp 30ª having a straight, forward edge corresponding with the face of the step. Since the unit is entirely preformed the screws or bolts 33ª may extend either upwardly or downwardly through the clamps and bed-plate for securing the clamps and bars to the bed-plate.

Fig. 10 shows substantially the same construction as Fig. 9, the fillers being omitted, but with the addition of anchoring bolts 62 having the recessed portions 63 and pointed enlarged heads 64, the bolts having a screw-threaded portion adapted to be screwed into the bed-plate or cross-piece 58 (54).

The use of the anchor elements 62 on the pavement unit shown in Fig. 10 permits the use of this unit with a plastic pavement material as in the first form of the invention.

In Fig. 11 I have shown a transverse vertical section of a metallic unit constructed substantially as shown in Fig. 8, wherein the bars 28 and 28ª are secured to the risers 60 and bed-plate 58 by means of the bolts or screws 33ᵇ. The front of the unit is protected by means of the face-plate 46ª which serve to hold the unit 28ª in position and to hold the risers 60 to the bed-plate 58.

In Fig. 12 I have shown the method of securing a unit constructed as shown in any of Figs. 5 to 7 to the supporting base or frame 66 by means of the lugs 34 described above. Bolts 40 are sunk inwardly into the openings 41 of the lugs 34 and pass through the bed-plate 58 and into base 66 so as to securely attach the unit to the framework 66. It is to be understood that the lugs 34 are positioned at various points about the surface of the unit for securely attaching the unit to the frame.

Fig. 13 discloses a portion of a complete unit of the form shown generally in Figs. 5 to 12 wherein the bars 28 are spaced by the fillers 50 and held to the bed-plate 58 by the clamps and lugs as described above. The front edge of the unit is protected by means of the bar 28ª having the rounded projection 29 beneath which there extends the face-plate 46ª bolted to the bed-plate 58 and risers 60ª, the face-plate serving to hold the bed-plate, risers and bars together and to protect the edge of the same from injury. Any desirable number of lugs 34 and clamps 30 may be used to securely hold the bars to the bed-plate. The rearward edge of the unit shown in Fig. 13 may be provided with a terminal bar 28ᵇ having an enlargement 29ᵇ spaced from the bed-plate for permitting the introduction of a clamp plate 46ᵇ or other clamping means for securing the terminal bar 28ᵇ to the bed-plate The unit as constructed in Fig. 13 is adapted to be secured over the whole or a portion of the steps of the frame, for example as shown in Fig. 14, wherein the usual framework 68 is provided with the tread unit of Fig. 13 extending over the entire step. Obviously, if desired, this unit may be so proportioned as to extend over only a portion of the step as shown for example in Fig. 2.

I have shown in Fig. 15 a slightly modified form of anchor cross-piece 30ª the upper edge of which is formed with grooves or notches 70 having upwardly tapering sides for engagement with the lower projections of the bars 28. This form of the invention is intended to be used in the same manner as shown in Figs. 1 to 3, the advantages thereof being cheapness in construction and the use of fewer parts in its manufacture.

In Fig. 16 a slightly modified form of bar 28ᵈ is disclosed having the concave sides with the upper and lower projections having the upper surface thereof solid thereby omitting the groove 35 shown in Fig. 4. This bar has the advantage of being more readily molded and is secured in position and secures the filler blocks in position in the same manner as described above in connection with the bars 28.

In the above description I have shown various adaptations of my invention showing that the basic principle can be applied to a variety of uses. The metal forming the same may be of any desired kind such as iron, steel, brass, etc., or a combination of one of these metals with some other substance such as carborundum, emery or the like, rolled or cast into the metal in order to give it a high co-efficient of friction. The units may be supplied either as the metallic part alone or as filled tread units ready to be secured in place and used. The fillers which are positioned between the surface bars may be either pre-formed or molded or compressed into the unit after the same has been assembled, the upper surface of the unit in either instance presenting both the metal and pavement materials so as to provide long wear and a substantial non-slipping tread surface.

While I have shown and described certain specific embodiments of my invention it is to be understood that these are merely illustrative and that I am to be limited only as set forth in appended claims.

I claim as my invention:

1. In a tread surface for pavements, a series of spaced parallel bars exposed adjacent the surface of said pavement and formed with outwardly and upwardly inclined side surfaces terminating in bifurcated exposed edges, and spacing means between said bars comprising pavement material and securing clamps.

2. In combination with a body of pavement material, a metallized tread surface comprising a series of spaced parallel bars, a series of vertically arranged transverse attachment plates engaged beneath said bars, means for securing said bars to said plates, said plates being apertured and said bars being laterally spaced to permit continuity of pavement material through said plates and between said bars.

3. A metallized tread surface for pavements comprising a series of spaced parallel bars, a transverse attachment plate engaged beneath said bars, means for securing said bars to said plate, said means including a filler lug occupying substantially the entire space between said bars adjacent the ends of the latter and fillers formed of pavement material positioned between and spacing said bars.

4. A metallized tread surface for pavements comprising a series of spaced parallel bars, a transverse attachment plate engaged beneath said bars, means for securing said bars to said plate, pavement fillers spacing said bars and exposed adjacent the upper surface thereof, an ultimate bar of said series having an enlarged side projection extending to the edge of said tread surface.

5. A metallized tread surface for pavements comprising a series of spaced parallel bars, a transverse attachment plate engaged beneath said bars, means for securing said bars to said plate, pavement fillers spacing said bars and exposed adjacent the upper surface thereof, an ultimate bar of said series having an enlarged side projection extending to the edge of said tread surface and a face plate engaged with said ultimate bar and extended downwardly therefrom for protecting a side edge of said pavement.

6. A Y-shaped metallic paving bar formed with outwardly diverging upper projections forming inclined outer surfaces and a securing portion beneath said projections.

7. A Y-shaped metallic paving bar formed with outwardly diverging upper projections forming inclined outer surfaces and a relatively narrow portion beneath said projections, said bar having an outwardly flared base.

8. A metallized pavement for a walkway surface consisting of the pavement material of which the walkway is composed, a metal walkway unit including bars formed with concave surfaces embedded therein, the pavement material extending upwardly to and between said bars, and the space between the upper projection of the concave sides of the bars and said pavement material being occupied by a prepared filler which is inserted into this space and made to be monolithic with the pavement material below it.

9. In combination with a body of pavement material, a vertically arranged skeleton frame member embedded therein and spaced from the upper surface of said pavement material, said frame member being formed with an apertured body part and a bearing portion, a plurality of metallic tread bars and means for securing said bars to the bearing portion of said frame member in spaced relation to one another.

10. In combination with a body of pavement material, a vertically arranged skeleton frame member embedded therein and spaced from the upper surface of said pavement material, said frame member being formed with an apertured body part and a bearing portion, a plurality of metallic tread bars and means for securing said bars to the bearing portion of said frame member in spaced relation to one another and a face plate secured to an end of said frame member.

Signed at New York in the county of New York and State of New York this 10th day of May A. D. 1926.

HERMAN H. SMITH.